Feb. 3, 1953     W. A. BEDFORD, JR     2,627,294

CAGE NUT

Filed May 5, 1950

INVENTOR:
WILLIAM A. BEDFORD JR.,
By Philip E. Parker
ATTORNEY.

Patented Feb. 3, 1953

2,627,294

UNITED STATES PATENT OFFICE 2,627,294

CAGE NUT

William A. Bedford, Jr., North Scituate, Mass., assignor to United-Carr Fastener Corporation, Cambridge, Mass., a corporation of Massachusetts Application May 5, 1950, Serial No. 160,335

8 Claims. (Cl. 151—41.74)

This invention relates to fasteners, and more particularly to fastener assemblies and retaining means for attaching a fastener to an apertured support, and aims generally to improve and simplify existing retaining means for that purpose.

One of the primary objects of the invention is the provision of a holder or retainer for a fastener which is adapted for self-locking attachment to an apertured support, thus eliminating the necessity of fastener attaching bolts, rivets, welding and like attaching means.

A further object of the invention is the provision of a novel and improved holder or retainer for non-rotatably mounting and supporting a fastener on an apertured support.

A still further object of the invention is the provision of a holder or retainer for a fastener having means for frictionally engaging and locking a cooperating fastener member in assembled relationship therewith.

Another and more specific object of the invention is the provision of a holder or retainer for fasteners having attaching means engageable with the edges of a support aperture or the like wherein means are provided for positively moving the attaching means from an initial non-support-engaging position into locked engagement with the edges of a support aperture and positively holding the attaching means in such locked position. An auxiliary object of the invention is the provision of a holder or retainer of the above type which may be formed from relatively non-resilient semi-rigid material, such as cold rolled steel, as contrasted with spring steel or the like generally required for devices of this type.

Still another object of the invention is the provision of an improved two-part fastener assembly of simple and economical construction which may be easily and quickly mounted on an apertured support and effectively locked thereon for engagement by a cooperating fastener member.

These and other objects and advantages of the invention will be apparent to those skilled in the art to which the invention pertains from a consideration of the accompanying drawings and annexed specification illustrating and describing a preferred embodiment of the invention.

Figure 1:
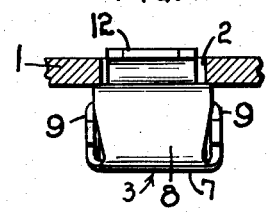
Fig. 1 is a side view of the device as installed on a supporting panel, the latter being shown in section.
Figure 2:
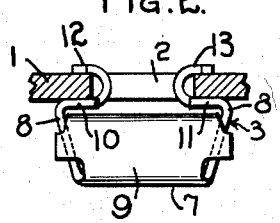
Fig. 2 is an end view of the assembly of Fig. 1.
Figure 3:
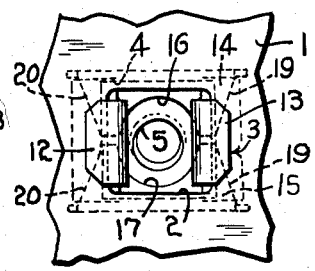
Fig. 3 is a top view of the assembly of Fig. 1.

Referring to the drawings, the support 1 may be any part adapted to mount a fastener member, as for example a sheet metal panel or the like, apertured at at 2 to receive cooperating portions of a holder or retainer 3 for the fastener member. The aperture 2 may be of any desired configuration but is preferably square, rectangular or the like to facilitate the non-rotatable attachment of the holder or retainer to the support.

The fastener member 4 may be of any suitable type such as a nut, rivet, bolt, screw or the like, and for purposes of exemplification is shown as comprising a conventional square nut internally threaded as at 5 to receive a cooperating threaded fastener member 6 as, for example, a threaded screw, bolt, stud or the like adapted to be passed through an aperture of a part to be supported.

The fastener member 4 is retained in assembled relation with the support 1 by the improved holder or retainer 3, a preferred construction of which is illustrated in the drawing.

According to the illustrated embodiment of the invention, the holder or retainer 3 may be made of relatively non-resilient thin sheet metal, for example cold rolled steel, and suitably formed into a cagelike member comprising a base 7 having an enlarged bolt passage 7ª and adapted to overlie one face of the fastener member 4, side walls or arms 8 and end walls or arms 9 integral with the base 7 and adapted to overlie opposite lateral faces of the fastener member 4. When attached to a support the side and end walls 8 and 9 of the retaining member lie closely adjacent the sides of the fastener member 4 to prevent turning thereof but have sufficient clearance therebetween to permit some shifting of the fastener member to facilitate alignment of the threaded opening therein with the cooperating fastener member 4.

At their upper ends the side walls 8 are turned inwardly over the fastener member 4 to form opposed flanged portions 10 and 11 which lie opposite the base 7 and in spaced relation to the adjacent face of the fastener member 4. The inner ends of the flanged portions 10 and 11 are provided in a reduced width slightly less than the width of the support aperture 2 and are reversely bent upon themselves to form oppositely disposed outwardly opening hook-shaped support-engaging members 12 and 13 initially spaced inwardly from the edges of a support aperture and adapted when forced apart to lockingly engage such edges to maintain the device in mounted position on the support.

In accordance with the invention the end walls 9 are provided with inwardly extending flanged portions 14 and 15 adapted to enter the space between the flanged portions 10 and 11 and the adjacent face of the fastener member 4 when the end walls 9 are pivoted inwardly toward each other and having arcuate-shaped cut-outs 16 and 17 at their inner terminal ends to permit passage of the cooperating fastener member 4 therebetween when so positioned. The lateral edges of the flanged portions 14 and 15 are inclined inwardly toward each other to form oppositely disposed converging cam edges 19 and 20 adapted to engage the inner edges of the side walls 8 and force them outwardly as the flanged portions 14 and 15 move inwardly toward each other. By virtue of this construction the flanged portions 14 and 15 act as wedge members and when forced inwardly between the side walls 8, cause them to move outwardly away from each other to position the hook-shaped members 12 and 13 in gripping and locking engagement with the edges of a support aperture.

Figure 5:
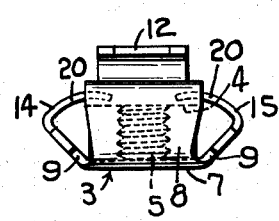
Fig. 5 is a side view thereof.

To facilitate the camming and wedging action of the cam edges 19 and 20 and the proper functioning of the device the flanged portions 14 and 15 are preferably convexly curved as shown in Fig. 5. Thus as they are moved inwardly toward each other the cam edges 19 and 20 thereof are substantially at right angles to the vertical end edges of the sides 8 at their points of contact therewith and slide therealong exerting a positive sidewise pressure to force the side walls apart.

Figure 4:
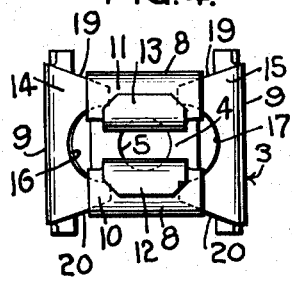
Fig. 4 is a top view of the assembled retainer and fastener prior to installation on a supporting panel.
Figure 6:
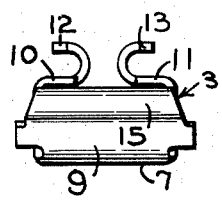
Fig. 6 is an end view thereof.
Figure 7:
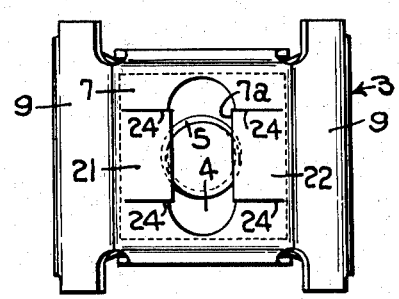
Fig. 7 is a bottom view thereof.

Initially and before attachment to a support the cage-like holder or retainer 3 is formed as shown in Figs. 4, 5 and 6 with the fastener member 4 positioned therein between the side walls 8 and the end walls 9. At this time the side walls 8 are disposed in their innermost positions with the outer edges of the hook-shaped support-engaging members 12 and 13 positioned inwardly of the edges of a support aperture to permit ready insertion of the hook-shaped members therein. At the same time the end walls 9 are disposed in their outermost positions in outwardly diverging relationship so that the reduced terminal end portions only of the flanged portions 14 and 15 are positioned between the side walls 8.

When it is desired to mount the assembly on an apertured support, the hook-shaped support-engaging members 12 and 13 are inserted into the support aperture until the oppositely disposed curved portions thereof are positioned opposite the edges of the aperture. The end walls 9 of the cage member 3 are then pinched together as with plier or the like, thereby pivoting them inwardly toward each other and forcing the wedge-shaped flanged portions 14 and 15 between the side walls 8 to move them apart. This moves the hook-shaped members 12 and 13 into locking engagement with the edges of the support aperture and holds them there since the material of which the holder is made, being relatively non-resilient, tends to retain its deformed position.

When thus assembled, the base 7, side and end walls 8 and 9 and flanged portions 10, 11, 14 and 15 of the cage-like member 6 firmly hold the fastener member 4 in non-rotatable position so that the threaded cooperating fastener member 6 may readily be engaged therewith.

A further feature of the invention resides in the provision of means for frictionally engaging and locking the cooperating fastener member 6 in position after it has been engaged with the fastener member 4. Such means comprise opposed gripping portions 21 and 22 of the base plate 7 adapted to frictionally engage the threads 23 of the cooperating fastener member 6 after it has been threaded through the fastener member 4. The portions 21 and 22 are preferably formed by slotting the base plate 7 longitudinally thereof as at 7ª, the slot 7ª being of somewhat less width than the diameter of the threads 23 of the cooperating fastener member 6 so that the side edges of the slot 7ª will bear thereagainst when the fastener member 6 is forced inwardly therebetween.

The base plate 7 may be slit transversely along the lines 24 so that the opposed gripping portions 21 and 22 may take the form of opposed tongues the terminal ends of which will bear against the threads 23 of the fastener member 6 when it is forced inwardly therebetween.

Figure 8:
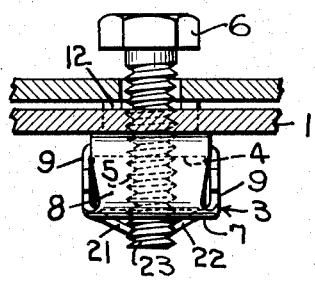
Fig. 8 is a side view similar to Fig. 1, but showing a cooperating fastener member locked in position by the retainer member.

When the device is mounted on a support and the cooperating fastener member 6 assembled therewith, as shown in Fig. 8, the terminal ends of the tongues or fingers 21 and 22 frictionally engage the threads 23 to lock the fastener member 6 in assembled position.

It will thus be seen that the present invention provides a novel and improved holder or retainer for mounting a fastener member on an apertured support. The device is simple and economical in construction, easily assembled and mounted, and when mounted exerts a positive lock-type gripping action on the support to securely mount the fastener member in non-rotatable position.

Although I have illustrated and described a preferred embodiment of the invention, I do not intend to be limited thereto as the scope of the invention is best defined in the appended claims.

I claim:

1. A fastener assembly adapted to be connected to an apertured support comprising a fastener member, a retainer member for attaching said fastener member to a support comprising a cage-like member surrounding said fastener member and having a base, side and end walls connected to said base, support-engaging members connected to the ends of said side walls and movable outwardly to engage the edges of a support aperture, said end walls normally extending angularly and outwardly from said base, wedge-shaped members connected to the ends of said end walls extending between said fastener member, said side walls and support-engaging members and movable inwardly between said side walls to force them outwardly and move said support-engaging members laterally into support-engaging position.

2. A fastener assembly adapted to be connected to an apertured support comprising a fastener member, a holder for attaching said fastener member to a support comprising a base having a plurality of pairs of opposed wall portions adapted to hold said fastener member in non-rotatable position, oppositely disposed support-engaging members connected to the ends of one pair of opposed wall portions and movable outwardly away from each other into locking engagement with the edges of a support aperture, and inwardly extending cam-shaped members connected to the ends of the other pair of wall portions and disposed transversely to the first named pair and movable inwardly between wall portions and above said fastener member to force them outwardly away from each other and thereby cause said support-engaging members to engage a support.

3. Fastener assembly means for securing male and female fastener members in assembly with an apertured support comprising a retainer cage having a base, angularly disposed side wall portions extending from opposite sides of said base and provided at their terminal ends with inwardly extending reversely hooked support-engaging portions, additional wall portions extending angularly from said base intermediate said side wall portions and provided at the upper ends thereof with inwardly extending flanges disposed between and extending across said side wall portions below said support-engaging portions and in spaced relation to said base, said inwardly extending flanges of said additional wall portions being provided with cam surfaces for engagement with said side wall portions as said additional wall portions are moved radially inwardly to thereby force said side wall portions laterally outwardly and cause said support-engaging hook portions to engage an edge of a support aperture.

4. A fastener assembly adapted to be connected to an apertured support comprising a fastener member, a retainer for attaching said fastener member to an apertured support comprising a cage-like member having a base and oppositely disposed wall portions positioned outwardly of said fastener member, oppositely disposed reversely turned support-engaging portions connected to the ends of said wall portions and movable outwardly therewith away from each other to engage the edges of a support aperture, and cam means connected to said base member and movable inwardly between said wall portions above the fastener member and below the support-engaging portions to spread said wall portions apart and cause said reversely turned portions to grippingly engage the edges of a support aperture.

5. Fastener assembly means as defined in claim 3 in which the base of the retainer cage is apertured and is provided with opposed resilient fastener-gripping members formed as an integral extension of said additional wall portions having end portions extending into said aperture.

6. A holder for attaching a fastener member to a support comprising a base, side walls connected to said base, support-engaging members connected to the ends of said side walls and being movable outwardly to engage the edges of a support aperture, a cam-shaped expansion member disposed between said side walls in a plane normal thereto below said support-engaging portions and spaced from said base, means connecting said expansion member to said base, said last named means and expansion member being movable transversely of said holder between said side walls to force said support-engaging members laterally away from each other.

7. A holder as defined in claim 6 in which the expansion member is wedge-shaped and has opposed bevelled edges and a central recess for straddling a fastener member.

8. A holder as defined in claim 6 further characterized in that the base is apertured and is provided with opposed gripping members formed as an integral extension of the means connecting the expansion members to the base to frictionally engage a fastener member extended through said aperture.

WILLIAM A. BEDFORD, JR.

REFERENCES CITED

The following references are of record in the file of this patent:

UNITED STATES PATENTS

| Number | Name | Date |
|---|---|---|
| 2,274,014 | Tinnerman | Feb. 24, 1942 |
| 2,495,037 | Tinnerman | Jan. 17, 1950 |